(12) United States Patent  
Hubinger et al.

(10) Patent No.: US 7,462,803 B2  
(45) Date of Patent: Dec. 9, 2008

(54) DISCONNECTION BOX FOR A ROBOT SYSTEM

(75) Inventors: Manfred Hubinger, Kremsmünster (AT); Georg Binder, Pettenbach (AT); Helmut Wimroither, Steinbach/Zieberg (AT)

(73) Assignee: Fronius International GmbH, Pettenbach (AT)

( * ) Notice: Subject to any disclaimer, the term of this patent is extended or adjusted under 35 U.S.C. 154(b) by 68 days.

(21) Appl. No.: 10/529,293

(22) PCT Filed: Oct. 6, 2003

(86) PCT No.: PCT/AT03/00300

§ 371 (c)(1),  
(2), (4) Date: Mar. 25, 2005

(87) PCT Pub. No.: WO2004/033141

PCT Pub. Date: Apr. 22, 2004

(65) Prior Publication Data

US 2006/0043080 A1    Mar. 2, 2006

(30) Foreign Application Priority Data

Oct. 8, 2002    (AT)   ............................. A 1524/2002

(51) Int. Cl.  
*B23K 9/12*    (2006.01)

(52) U.S. Cl. ................................... 219/124.34; 901/42

(58) Field of Classification Search ............ 219/124.34, 219/125.1; 901/42

See application file for complete search history.

(56) References Cited

U.S. PATENT DOCUMENTS

| 4,540,869 A | 9/1985 | Yasuoka | 219/124.34 |
| 4,935,597 A | 6/1990 | Zimmer | 219/124.34 |
| 5,018,705 A | 5/1991 | Baldwin | 266/77 |

FOREIGN PATENT DOCUMENTS

| CN | 2101551 | | 4/1992 |
| EP | 0 352 576 | * | 1/1990 |
| EP | 0 352 576 A2 | * | 1/1990 |
| EP | 0352576 | | 1/1990 |
| GB | 1224180 | | 3/1971 |

(Continued)

OTHER PUBLICATIONS

International Search Report.

*Primary Examiner*—Kevin P Kerns  
(74) *Attorney, Agent, or Firm*—Collard & Roe, P.C.

(57) ABSTRACT

A switch-off box for a robot system has a two-part housing and a coupling device resiliently mounted in the housing and connected to a torch body and a hose pack or to a torch handle connected with the hose pack, and having a supporting surface for punctual contact on the housing. There are contacting or switching elements connected to the coupling device. Two oppositely located openings are provided in the housing for connection of the coupling device to the torch body and for connection of the coupling device to the hose pack or the torch handle. The supporting surface is connected with the contacting or switching elements so that a respective contacting or switching element will be activated or deactivated by lifting of the supporting surface from the housing, and a signal will be transmitted from the contacting or switching element to an interfaced control device, or the robot system.

6 Claims, 5 Drawing Sheets

FOREIGN PATENT DOCUMENTS

| | | | |
|---|---|---|---|
| GB | 2 118 524 A | * | 11/1983 |
| GB | 2118524 | | 11/1983 |
| JP | 7-178546 | | 7/1995 |
| JP | 08 090481 | | 4/1996 |
| JP | 8-90481 A | * | 4/1996 |

* cited by examiner

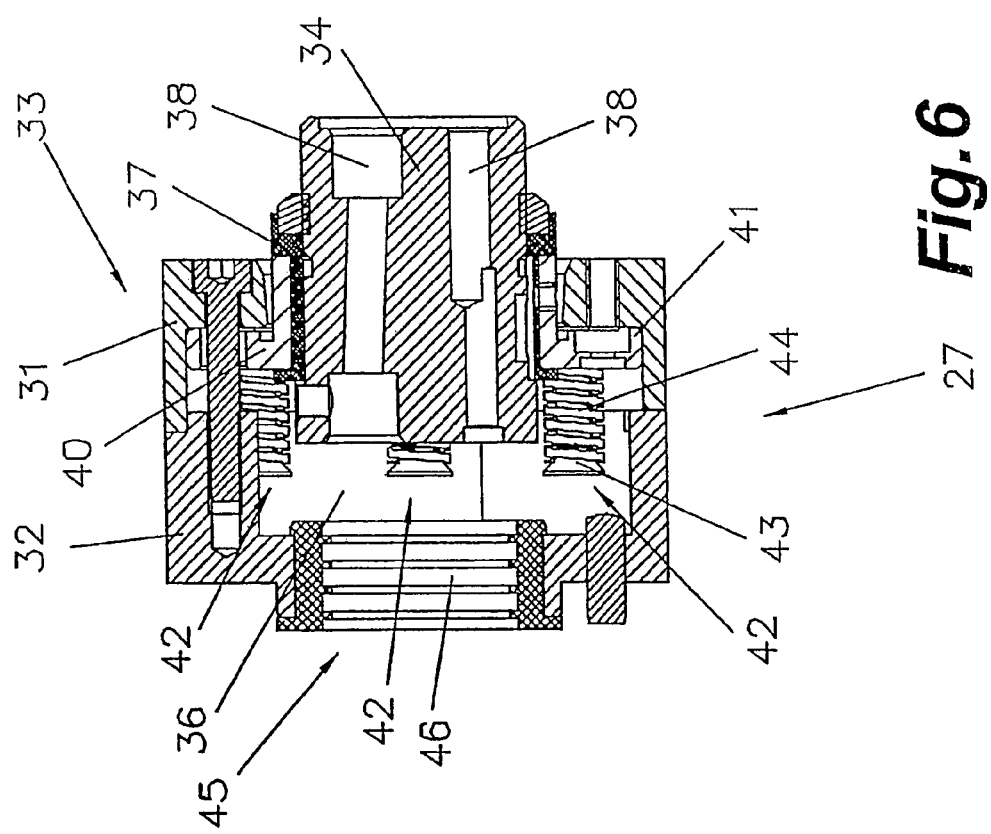
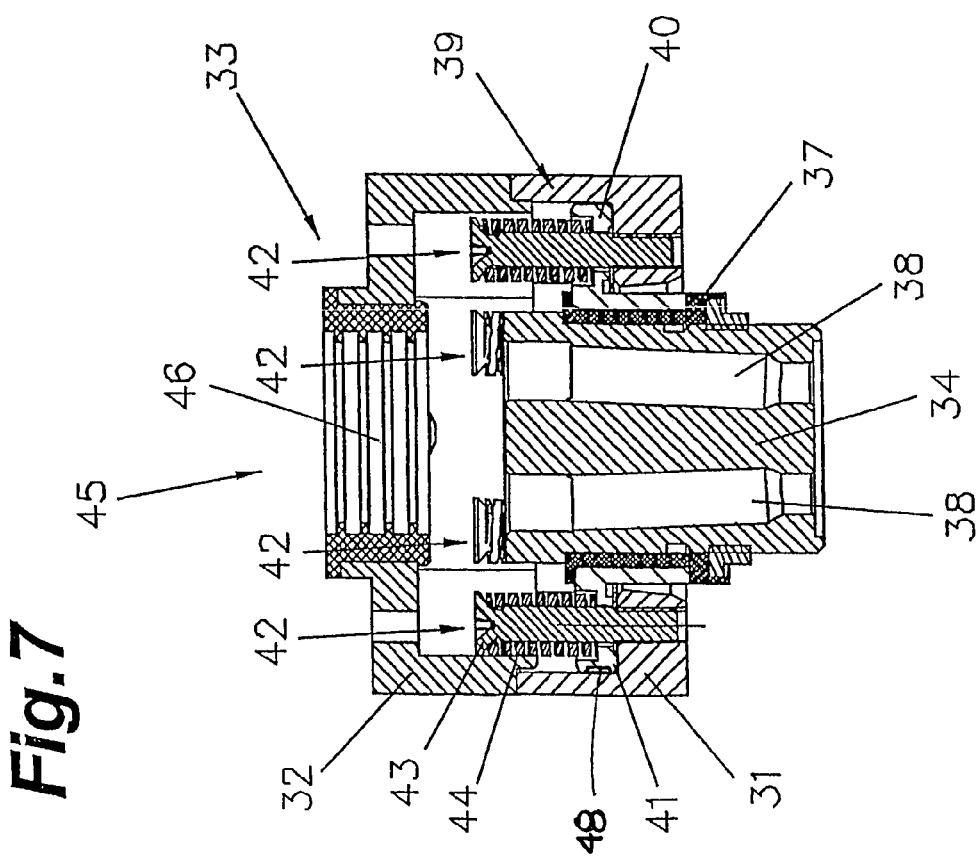

DISCONNECTION BOX FOR A ROBOT SYSTEM

CROSS REFERENCE TO RELATED APPLICATIONS

Applicants claim priority under 35 U.S.C. §119 of Austrian Application No. 1524/2002 filed Oct. 8, 2002. Applicants also claim priority under 35 U.S.C. §365 of PCT/AT2003/000300 filed Oct. 6, 2003. The international application under PCT article 21(2) was not published in English.

BACKGROUND OF THE INVENTION

1. Field of the Invention.

The invention relates to a switch-off box for a robot system, including a coupling means resiliently mounted in a housing and designed to be connected to a hose pack and a welding torch formed by a torch body and, optionally, a torch handle.

2. The Prior Art.

Collision protection detection means or switch-off boxes are known from the prior art, yet these are directly installed in robots, i.e., in a robot arm. Components are attached to those switch-off boxes integrated in the robots. This involves the disadvantage of such integrated switch-off boxes having to take up the entire weight of the attached components and hence to be very rigidly designed, thus adversely affecting the switch-off behavior.

From U.S. Pat. No. 4,540,869 A, a welding torch for use in a welding robot comprising a collision protection means is known, which includes a resiliently mounted coupling element designed to be connected to a hose pack and a welding torch. This entails the drawback of a relatively complex construction, which also serves to allow radial movements of the welding torch.

JP 7-178546 A likewise discloses a welding torch including a collision protection means, yet the connection of the hose pack is not illustrated. If the hose pack were to be fastened to the coupling means, the switch-off box would have to take up the very high weight of the components attached to the same, thus adversely affecting the switch-off behavior.

GB 1 224 180 A shows a device for controlling the movement of a tool, for instance a welding torch, in which a finder can be mounted to detect the path of movement of the tool. On a robot arm connected with the finder are arranged elements to detect a collision of the finder with the tool and actuate the motors of the robot control accordingly. Again, the switch-off behavior is adversely affected because of the collision detection means being installed in the robot arm.

SUMMARY OF THE INVENTION

The object of the present invention, therefore, consists in providing an independent switch-off box capable of being flexibly used at any desired site or position of the robot system. In addition, the switch-off box is to be configured in a manner as simple as possible and characterized by as quick and simple a response as possible.

The objects according to the invention are achieved in that the housing is comprised of two parts and the coupling means is designed for punctual contact on the housing. This offers the advantage of the switch-off box being directly arrangeable in the welding torch, i.e., between the individual components of the welding torch. The switch-off box may, thus, be positioned as close to the jeopardized region as possible so as to readily detect already slight collisions. A further advantage resides in that the hose pack and the torch handle, respectively, can be connected with the switch-off box such that the latter will take up the weight of the components and the resiliently mounted coupling means of the switch-off box need only be dimensioned to fit the weight of the torch body. The punctual contact of the coupling means on the housing ensures the rapid response behavior of the switch-off box, since, at the occurrence of a collision, such collision will be immediately detected by the opening of the punctual contact and the respective control of the robot system will be enabled by the appropriate arrangement of contacting elements or switching elements.

BRIEF DESCRIPTION OF THE DRAWINGS

The present invention will be explained in more detail by way of the accompanying drawings, which illustrate an exemplary embodiment of the switch-off box.

In the drawings,

FIG. 6 is a sectional illustration through the switch-off box along lines VI-VI of FIG. 4;

FIG. 7 is a sectional illustration through the switch-off box along lines VII-VII of FIG. 4.

DETAILED DESCRIPTION OF THE PREFERRED EMBODIMENT

Figure 1:
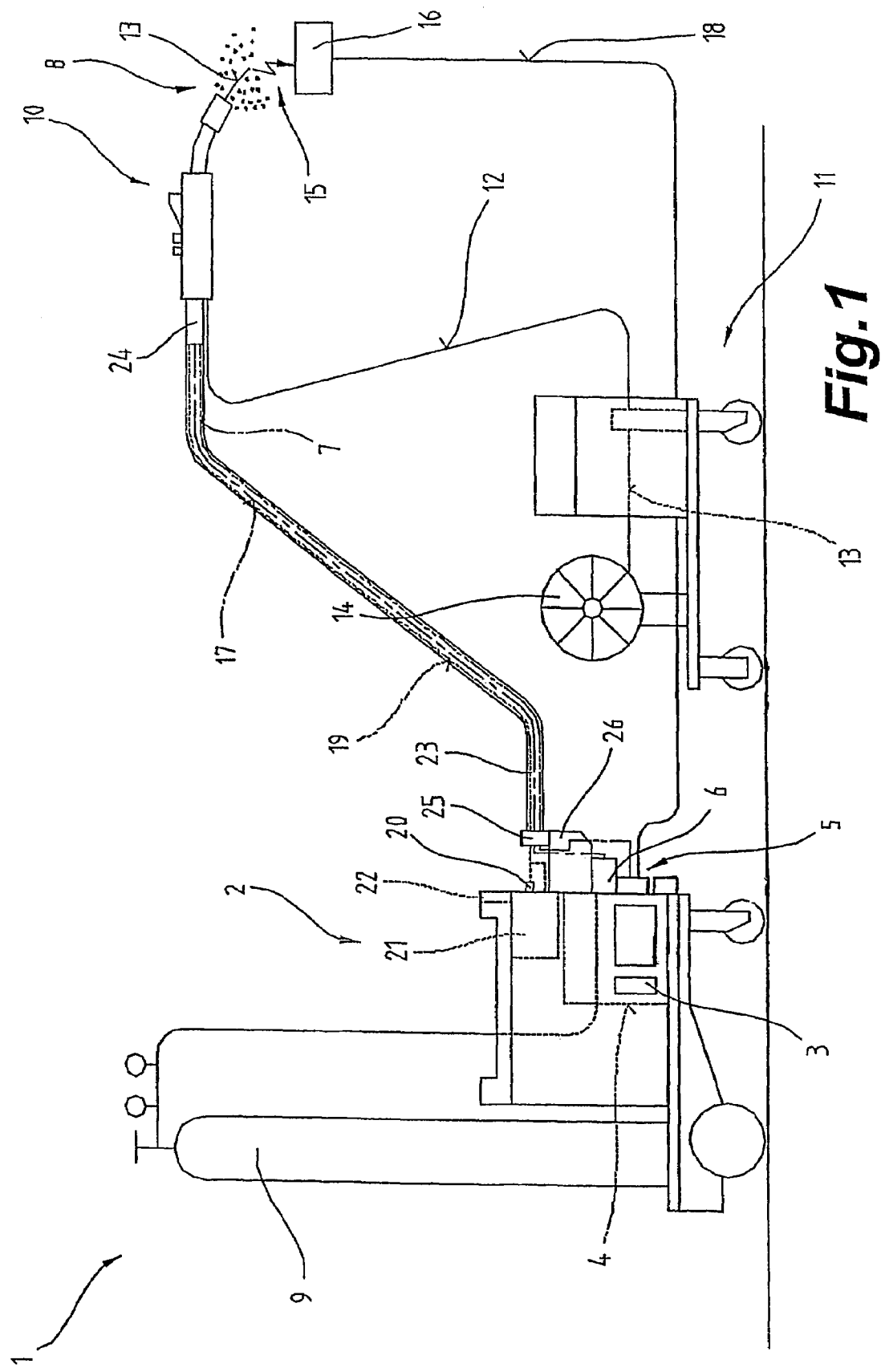
FIG. 1 is a schematic illustration of a welding apparatus or welding device.

FIG. 1 depicts a welding device 1 or welding apparatus for various processes and methods such as, e.g., MIG/MAG welding or WIG/TIG welding or electrode welding methods, double wire/tandem welding processes, plasma or soldering methods etc. It is, of course, possible to use the solution according to the invention with a power source or welding current source.

The welding device 1 comprises an energy source 2 including a power element 3, a control device 4 and a switch member 5 associated with the power element 3 and the control device 4, respectively. The switch member 5, and the control device 4, are connected with a control valve 6 arranged in a feed line 7 for a gas 8 and, in particular, a protective gas such as, for instance, $CO_2$, helium, argon and the like, between a gas reservoir 9 and a welding torch 10, or a burner, respectively.

In addition, a wire advance system 11 common to MIG/MAG welding can be activated via the control device 4, with a filler metal or a welding wire 13 being fed via a feed line 12 from a supply drum 14 into the region of the torch 10. It is, of course, also possible to integrate the wire advance system 11 in the welding device 1 and, in particular, in the basic housing, as is known from the prior art, rather than design it as an accessory unit as illustrated in FIG. 1.

It is also possible for the wire advance system 11 to supply the welding wire 13, or filler metal, to the process site externally of the welding torch 10, to which end a non-consumable electrode is preferably arranged in the welding torch 10, as is common with WIG/TIG welding.

The power required to build up an electric arc 15 and, in particular, an operative electric arc, between the welding wire 13 and a workpiece 16 is supplied from the power element 3 of the energy source 2 to the welding torch 10 through a welding line 17, wherein the workpiece 16 to be welded, which is comprised of several parts, is likewise connected with the welding device 1 and, in particular, the power source 2 via a further welding line 18, thus enabling a power circuit for a process to build up over the electric arc 15, or the plasma jet formed.

To provide cooling of the welding torch 10, the welding torch 10 is connectable to a fluid reservoir and, in particular, water reservoir 21 via a cooling circuit 19 with a flow control 20 interposed, whereby the cooling circuit 19, particularly a fluid pump used for the fluid contained in the fluid reservoir 21, is started as the welding torch 10 is being put into operation, thus effecting cooling of the welding torch 10.

The welding device 1 further comprises an input and/or output device 22, via which the different operating parameters, modes of operation or welding programs of the welding device 1 can be adjusted and/or called. In doing so, the welding parameters, modes of operation or welding programs adjusted by the input and/or output device 22 are transmitted to the control device 4, which, in turn, will subsequently activate the respective components of the welding apparatus or welding device 1.

Furthermore, the welding torch 10 in the exemplary embodiment illustrated is connected with the welding device 1 or welding apparatus via a hose pack 23. The individual lines leading from the welding device 1 to the welding torch 10 are arranged within the hose pack 23. The hose pack 23 is connected with the welding torch 10 via a coupling device 24 or central connection, whereas the individual lines within the hose pack 23 are connected with the individual contacts of the welding apparatus 1 via connection sockets or plug-in connections. In order to ensure the appropriate strain relief of the hose pack 23, the hose pack 23 is connected with a housing 26 and, in particular, the basic housing of the welding device 1 via a strain relief means 25. The coupling device 24 may naturally also be used for the connection on the welding device 1.

Basically, it should be noted that not all of the aforementioned components need be used or employed for the various welding methods or welding devices 1 such as, for instance, WIG devices or MIG/MAG devices or plasma devices.

Figure 2:
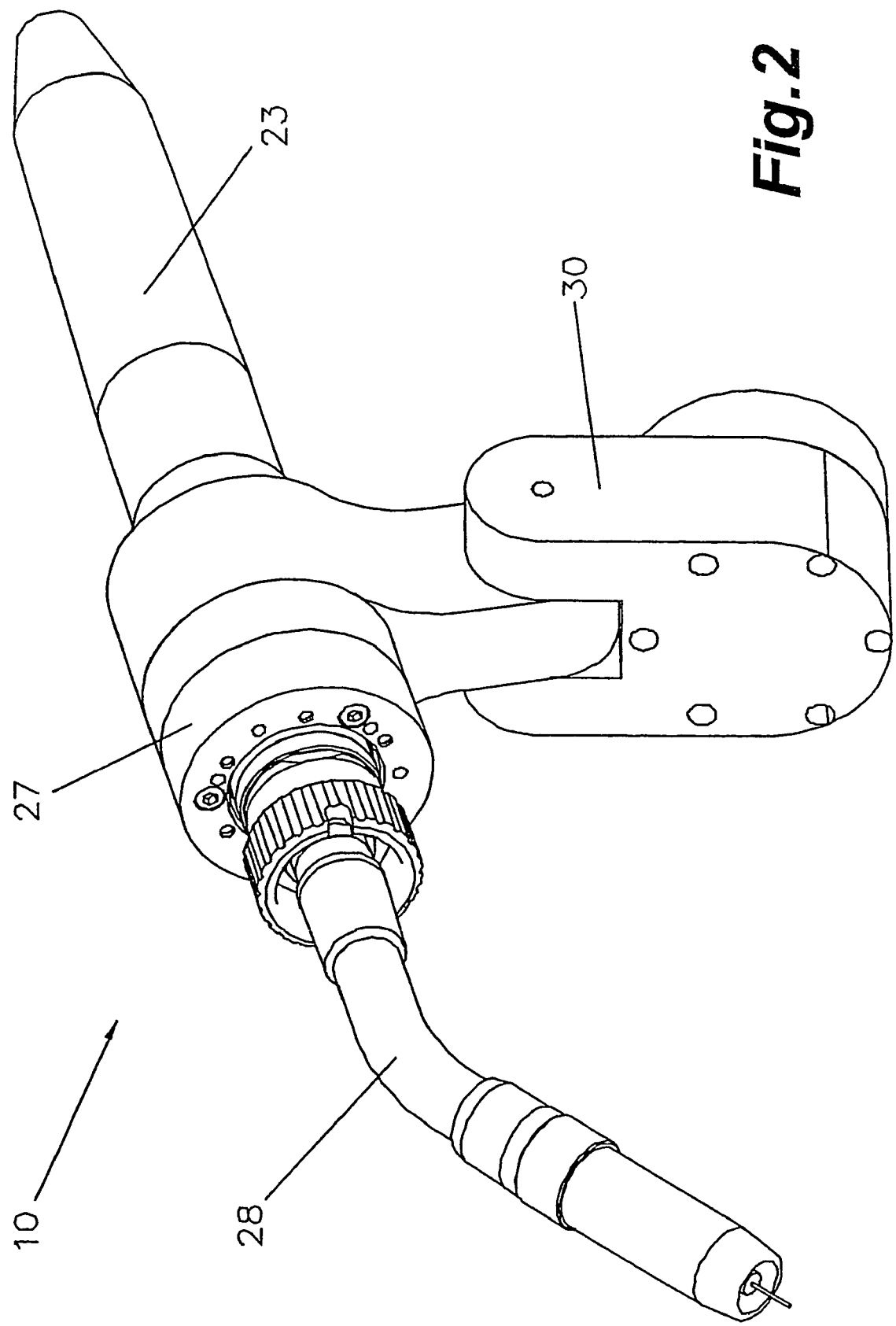
FIG. 2 is a schematic illustration of the arrangement of a switch-off box on the welding torch between the torch body and the hose pack.
Figure 3:
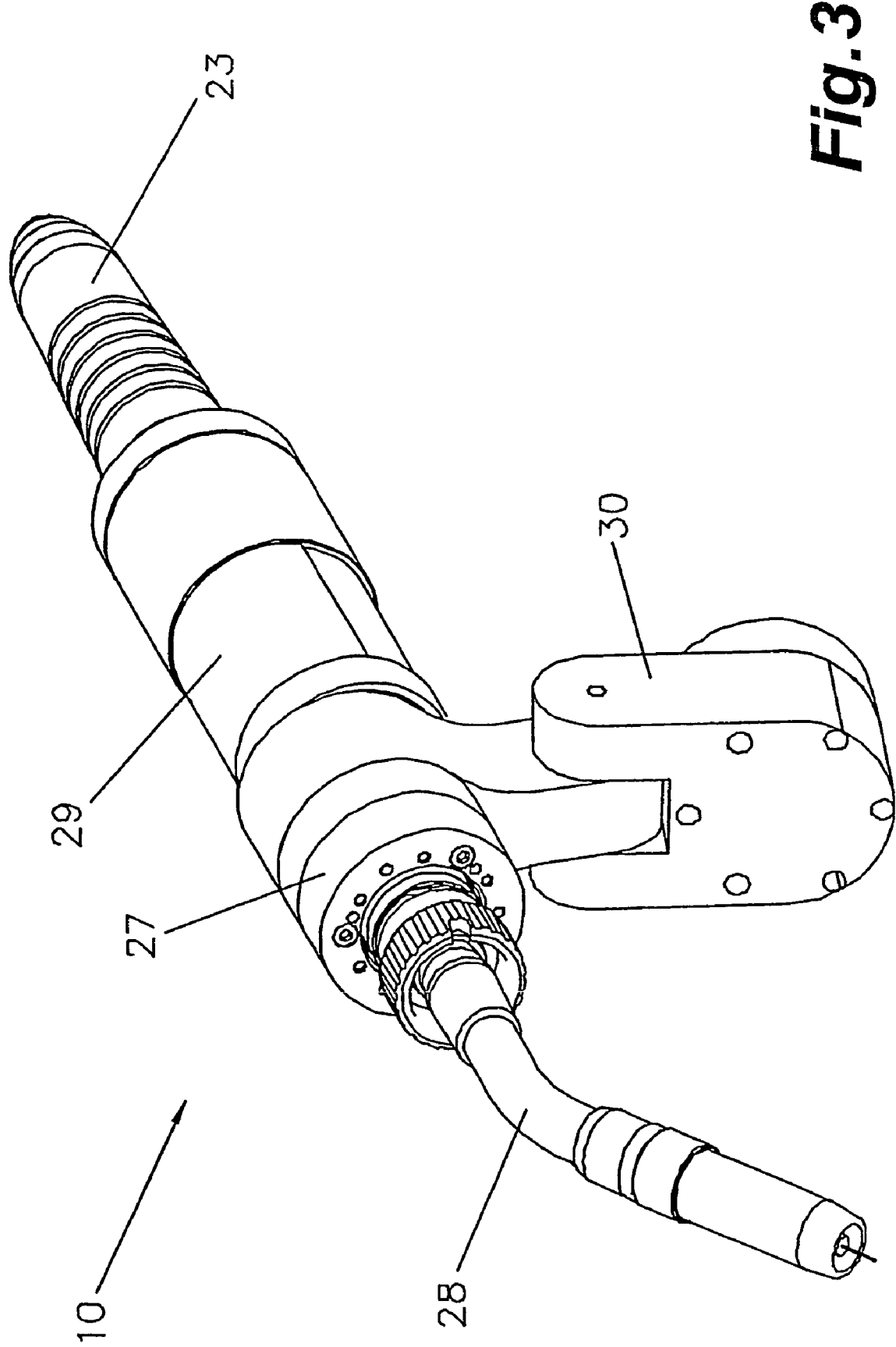
FIG. 3 is another illustration of the arrangement of a switch-off box on the welding torch between the torch body and the torch handle.
Figure 4:
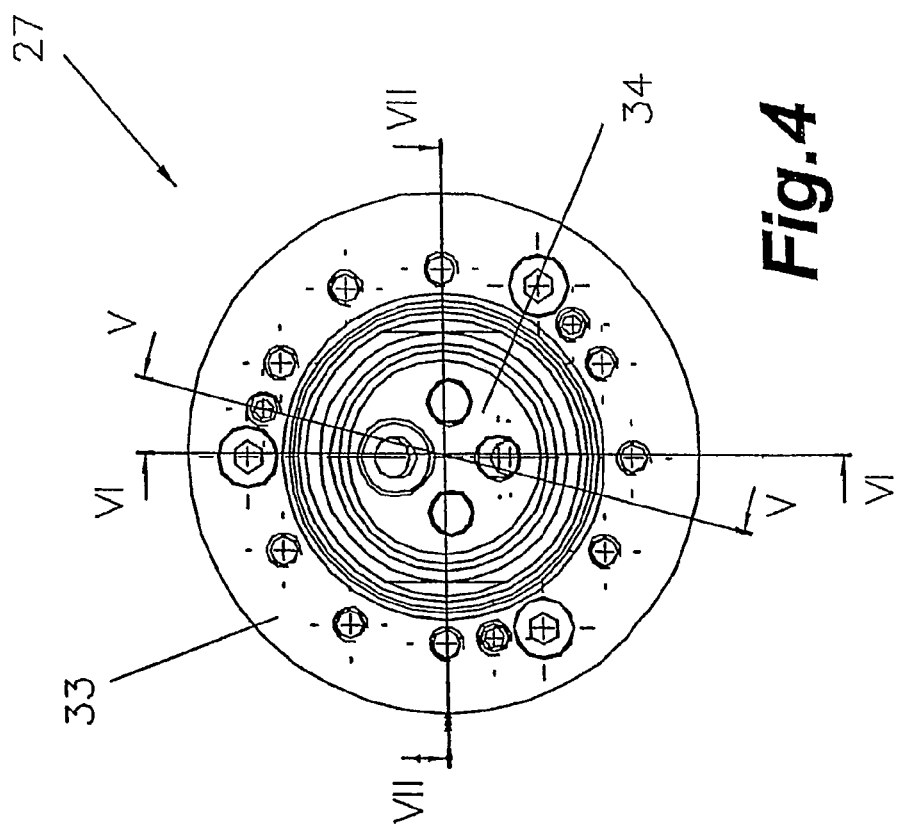
FIG. 4 is a front view of the switch-off box without any components attached thereto.
Figure 5:
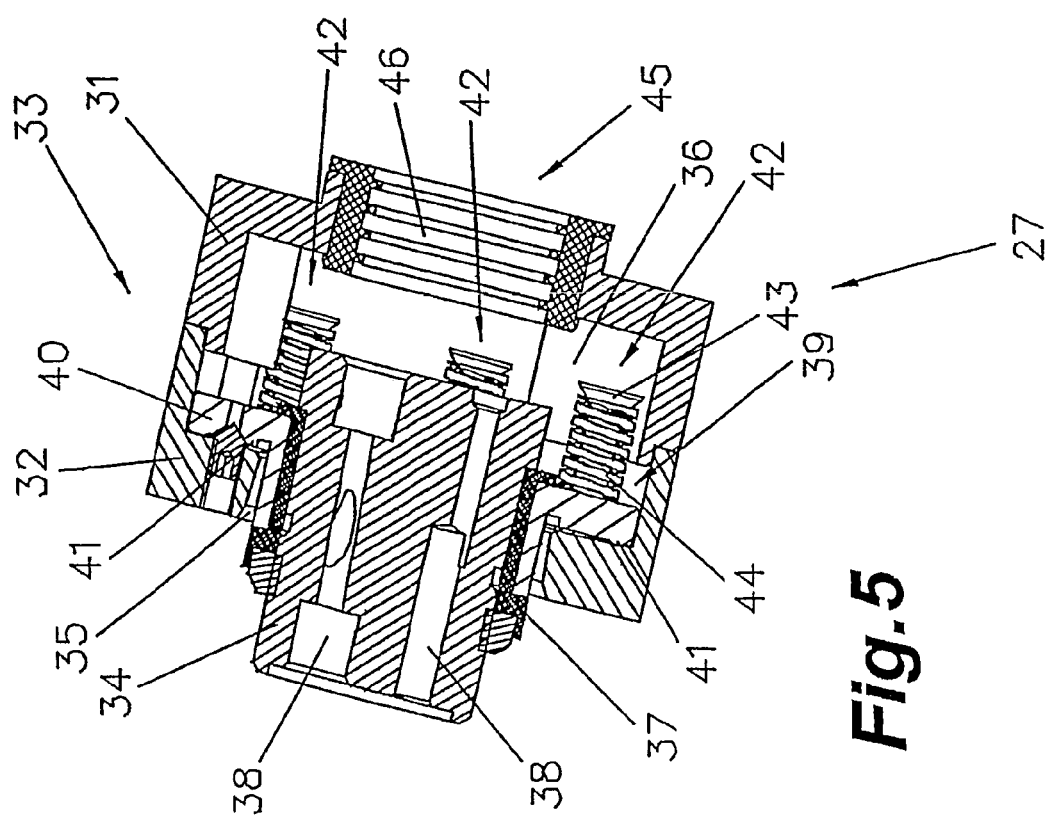
FIG. 5 is a sectional illustration through the switch-off box along lines V-V of FIG. 4.

In FIGS. 2 and 3, an application example of a switch-off box 27 for a robot system and, in particular, a welding apparatus is illustrated. In this case, the switch-off box 27 is directly arranged on the welding torch 10, namely between a torch body 28 and a hose pack 23 in FIG. 2, and between the torch body 28 and a torch handle 29 in FIG. 3, which torch handle, for instance, includes an integrated wire feed to which the hose pack 23 is connected. The welding torch 10 with the integrated switch-off box 27 is fastened to a robot system (not illustrated) by the aid of a fastening means 30.

The use of the switch-off box 27 directly on the welding torch 10 offers the advantage of the switch-off box 27 having to take up less weight, thus exhibiting an improved switch-off behavior in the event of a collision. Moreover, the independent switch-off box 27 ensures optimum adaptations to be made in the arrangement of the switch-off box 27, since the latter may be used at the most diverse points in the robot system. It is also feasible to use the switch-off box 27 in such a manner that no welding components are connected, but that it is, for instance, used between the robot arm and the fastening means 30 for the welding torch 10.

FIGS. 4 to 7 schematically illustrate the switch-off box 27 in detail, wherein a coupling means 34 is resiliently mounted in a housing 33 comprised of two parts 31, 32. The coupling means 34 is designed for the connection of the welding torch 10, particularly its components, and the hose pack 23, with a commercially available central connection or coupling device from welding technology being realized on the coupling element 34 to connect the hose pack 23 with the welding torch 10. The function of the switch-off box 27 resides in performing a collision detection, whereby the switch-off box 27 is designed as a compact structural unit and hence an independent component capable of being appropriately positioned as a function of its field of use.

The switch-off box 27 is configured in a manner that the coupling means 34 is resiliently mounted in the housing 33 comprised of two parts 31,32 wherein the coupling means 34 projects out of the housing 33 through an opening 35, whereas the other end of the coupling means 34 may terminate in the interior of the housing 33. The torch body 28 may be fastened to the projecting end of the coupling means 34. A cavity 36 is formed in the interior of the housing 33. The coupling means 34 is preferably insulated relative to the housing 33, thus allowing electric energy and, in particular, welding current, to be transmitted via the coupling means 34. To this end, an insulation ring 37 is arranged in the exemplary embodiment illustrated. Channels 38 may be arranged within the coupling means 34, whereby the supplied media such as, for instance, cooling liquid, protective gas, etc. may be transferred from one side of the coupling means 34 to its other side, thus safeguarding the function of the welding torch 10. Furthermore, the coupling means 34 comprises a supporting surface 39 for the punctual contact on the housing 33, which supporting surface in the exemplary embodiment shown is formed by an external ring 40 having an L-shaped cross section and fastened to the insulation ring 37. Said external ring 40 having an L-shaped cross section may be designed to extend circumferentially or to comprise only some sections. Thus, it is ensured, on the one hand, that the coupling means 34 will be secured against slipping out of the housing 33 and, on the other hand, that a punctual contact will be provided in the housing 33. It is, in fact, essential that the coupling means 34 contacts the housing 33 only point-wisely so as to enable the point-wise lifting from the housing 33 in the event of a collision. The external ring 40 may, of course, also be formed by the coupling means 34.

In order to ensure a punctual abutment or contact on the housing 33, projections 41 are arranged on the external ring 40 so as to ensure punctual bearing on the housing 33. Instead of the projections 41, it is also feasible to use other spacer elements such as, for instance, spheres, in order to provide a punctual contact between the supporting surface 39 and the housing 33. In a preferred manner, three or five projections 41 are arranged there. The fixation of the coupling means 34 is realized by the aid of a screw connection 42 through the external ring 40 and the supporting surface 39, respectively, with a spring element 44 arranged between a screw head 43 and the external ring 40 and the supporting surface 39, respectively. Thus, the entire coupling means 34 is resiliently mounted so as to cause the suitable displacement of the coupling means 34 at a collision of the connected parts and, in particular, the torch body 28 with a solid object. In order for this to be detected, contacting elements or switching elements 48 are connected with the projections 41 and the supporting surface 39, respectively, in a manner that the contacting element will be activated or deactivated by the lifting of a single projection 41 from the housing 33 and a signal will, thus, be transmitted from the contacting element or switching element to an interfaced control device 4, or the robot system.

Furthermore, another opening 45 is provided in the housing 33 on the opposite side of the emergence of the coupling means 34 such that the lines supplied through the hose pack 23 may be conducted into the housing 33 to the coupling means 34. In a preferred manner, a further projection, or a thread 46, is arranged to connect an external hose of the hose pack 23 to the housing 33. This is to ensure that the weight of the hose pack 23 will not directly act on the coupling means 34, but will be transmitted onto the housing 33 of the switch-off box 27. The spring elements 44 for the mounting of the coupling means 34 may, thus, be designed to be weaker so as to considerably enhance the response behavior of the switch-off box 27.

In principle, is should also be noted that the switch-off box 27 serves to detect a collision with an object, of the torch body 28 fastened to the switch-off box 27. This is effected by a displacement or movement of the coupling means 34 in the interior of the housing 33, thus causing a projection 41 to be lifted and a signal to be delivered. In doing so, it is essential that the coupling means 34 is mounted in the housing 33 in a manner that a defined displacement and, in particular, lifting of the punctual bearings within the housing 33, of the switch-off box 27 will be ensured at the occurrence of a collision. It is, in fact, thus feasible to effect the suitable detection of a movement of the coupling means 34 by simply arranging contacting elements or switching elements, which constitutes a substantial structural simplification.

The invention claimed is:

1. A switch-off box for a robot system, comprising:
   a two-part housing;
   a coupling means resiliently mounted in the housing and insulated relative to the housing, and being connected to a torch body and a hose pack or a torch handle connected with the hose pack, and having a supporting surface for punctual contact on the housing, said supporting surface being formed by an external ring having an L-shaped cross section, said coupling means allowing transmission of electric energy, and said coupling means having channels for transferring supplied media from one side of the coupling means to another; and
   contacting or switching elements connected to the coupling means;
   wherein two oppositely located openings are provided in the housing for connection of the coupling means to the torch body and for connection of the coupling means to the hose pack or the torch handle,
   wherein a projection or thread is arranged on one side of the housing for connection with an external hose of the hose pack, and
   wherein several projections are arranged on the external ring and on the supporting surface, respectively, for punctual contact on the housing, said projections being connected with the contacting or switching elements so that a respective contacting or switching element is activated or deactivated by lifting of the supporting surface from the housing, and a signal is transmitted from the contacting or switching element to an interfaced control device, or the robot system.

2. A switch-off box according to claim 1, wherein the housing is arranged between the torch body and the hose pack.

3. A switch-off box according to claim 1, wherein the housing is arranged between the torch body and the torch handle, to which the hose pack is connected.

4. A switch-off box according to claim 1 wherein the coupling means projects out of the housing through an opening, whereas the other end of the coupling means terminates in the interior of the housing.

5. A switch-off box according to claim 1, wherein the supporting surface is directly formed on the coupling means.

6. A switch-off box according to claim 1, wherein fixation of the coupling means is realized by a screw connection through the external ring and the supporting surface, respectively, with a spring element arranged between a screw head and the external ring and the supporting surface, respectively.

* * * * *